April 24, 1928.  W. O. TRIMBLE  1,667,684
CAR BODY AND TRUCK GAUGE
Filed April 23, 1926   2 Sheets-Sheet 1
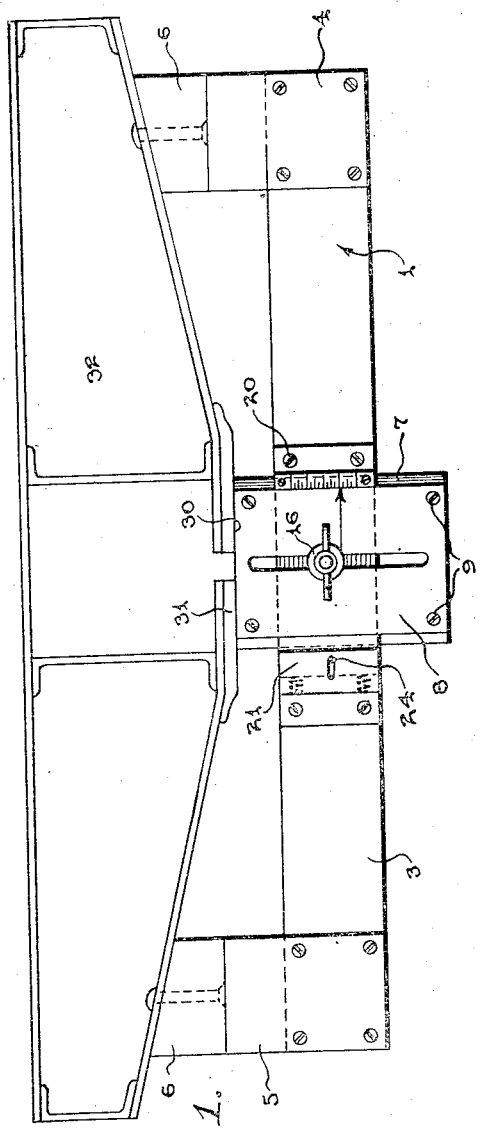
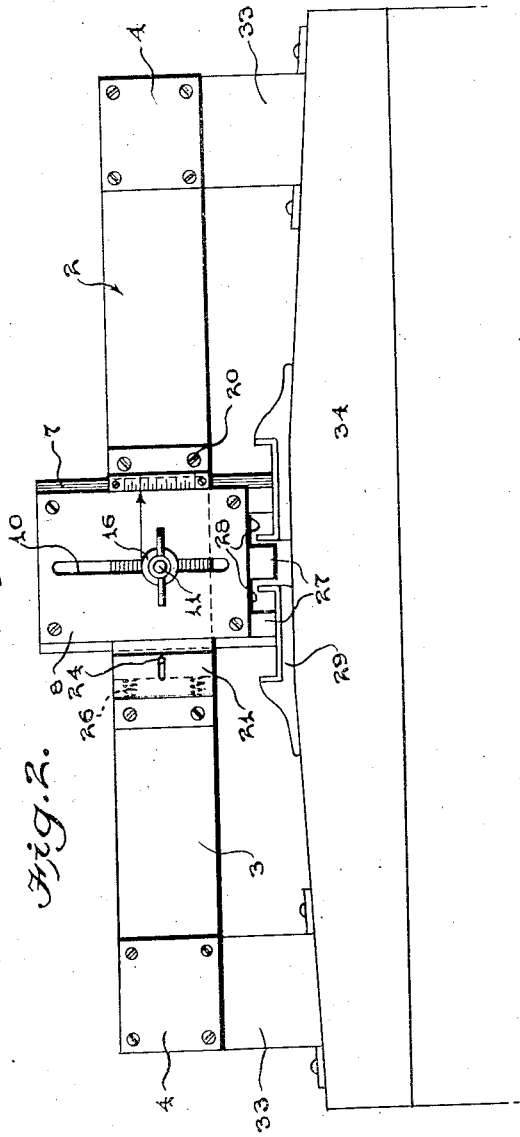
Inventor
W. O. Trimble
By
Attorney April 24, 1928.
W. O. TRIMBLE
1,667,684
CAR BODY AND TRUCK GAUGE
Filed April 28, 1926   2 Sheets-Sheet 2
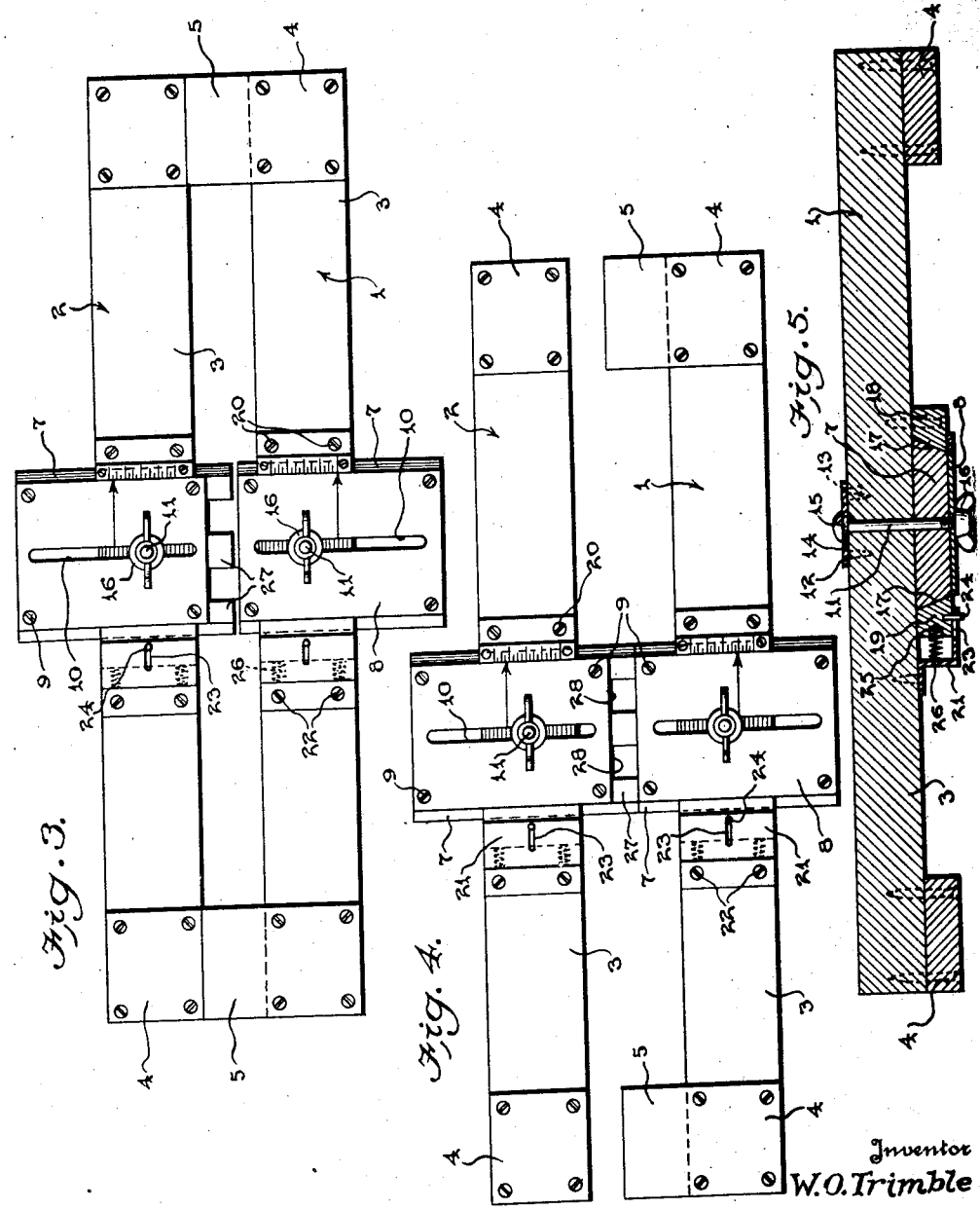
Inventor
W. O. Trimble Patented Apr. 24, 1928.

1,667,684

UNITED STATES PATENT OFFICE.

WILLIAM ORAN TRIMBLE, OF PHALANX STATION, OHIO, ASSIGNOR OF ONE-THIRD TO FRANK CAPPELLIA AND ONE-THIRD TO CHARLES J. CAPPELLIA, BOTH OF NILES, OHIO.

CAR BODY AND TRUCK GAUGE.

Application filed April 28, 1926. Serial No. 105,237.

Heretofore in determining the side bearing clearance between the side bearings of trucks of freight car bodies, it has been necessary to dispose the car bodies on the trucks to ascertain what clearance may appear, then the body is lifted from the truck for the purpose of driving the rivets and compensating for such discrepancy in the side bearings and then replaced. This method is very inconvenient, consuming considerable time and labor and very often resulting in unsatisfactory results.

It is a purpose of the present invention to provide, in a car body and truck gauge, a construction which eliminates the necessity of disposing the body on the truck and then removing the same, hence avoiding the loss of time and labor.

To accomplish this purpose, the invention aims to provide a pair of gauges substantially similar in construction, one to gauge the center and side bearings of the car body, the other to gauge the center and side bearings of the truck bolster, the two gauges being subsequently placed together and should the central gauge plates touch or assume positions too far away, it is necessary to either shim the center plate of the truck bolster or shim the side bearings of the truck bolster in order to properly balance the car body when placed in position.

Another purpose is to provide means on each gauge body capable of adjustment so that, when the gauge is placed in position, the central and end portions of the gauge should engage at three points with the car body or the truck bolster and when the two gauges are placed together, that is, after gauging the body and the truck bolster, it is possible to disclose what parts of the truck bolster are necessary to be shimmed.

Still another purpose is to provide a gauge including a central gauge plate slotted for the reception of means for holding the plate in different adjusted positions, said plate being dovetailed and mounted in dovetailed guides on the gauge, one of the guides being yieldably mounted and cooperating with the other guide for holding the central gauge plate set until its holding means is tightened for securing the plate in its set position.

It is to be understood that the particulars herein given are in no way limitative and that, while still keeping within the scope of the invention, any desired modifications of detail and desired proportions may be made in the apparatus according to the circumstances.

The invention comprises further features and combinations of parts to be hereinafter set forth, shown in the drawings and claimed.

In the drawings:

Figure 1 is a view in elevation showing one of the gauges in position for gauging the car body.

Figure 2 is a view in elevation showing the other gauge in position for gauging the truck bolster.

Figure 3 is a view in perspective of the two gauges placed together in order to disclose that certain points of the central gauge plates touch which will disclose the fact that the central plate of the truck bolster must be shimmed.

Figure 4 is a view in elevation showing the two gauges placed together with the central gauge plates disposed a substantial distance apart, which will disclose the fact that the side bearings of the truck bolster must be shimmed.

Figure 5 is a longitudinal sectional view through one of the gauges showing the central mounting of one of the gauge plates.

Referring to the drawings, 1 and 2 designate the body and truck bolster gauges, each comprising a gauge body 3 for the support of the gauge elements. The two gauges are substantially similar in construction with the exception that with the body gauge, the end plates 4 are extended, as shown at 5, for the purpose of assuming positions opposite to and gauging the side bearings 6 of the car body. In the truck bolster gauge, the plates 4 are not extended but are simply of the same width as the gauge body. It will be noted that the gauge body is constructed of cherry wood or wood fibre and if it were not for the plates 4, the ends of the body would become worn, scarred or otherwise injured or worn off from constant use which would result in inaccurate gauging of the side bearings of the truck bolster.

A central gauge member 7 is mounted upon each gauge body and comprises a block constructed of any suitable material, preferably wood fibre, and one surface thereof is faced with a face plate 8 secured in position by means of screws 9. This face plate and the block are provided with registering elongated slots 10 for the reception of the screw or bolt 11. The screw or bolt 11 passes through an opening in the gauge body and also through a facing plate 12 which is secured to the gauge body by means of screws 13. The facing plate 12 has a rectangular opening 14 which receives the rectangular base 15 of the head of the bolt, thereby preventing the bolt from turning when tightening up the wing nut 16 which is threaded upon the opposite end of the bolt. The wing nut tightens against the plate 8 which constitutes a wear plate and thereby holds the central gauge member or block in position.

The opposite edges of the gauge block or member are beveled, as shown at 17, whereby the block or member may engage the dove-tailed guides 18 and 19. The guide 18 is secured in position on the gauge body by means of screws 20 while the guide 19 is mounted in a guide plate 21. This plate 21 is angular, as shown, and is secured to the gauge body by the screws 22. The outstanding angular portion of the plate 21 overlies the dove-tailed guide 19 and is provided with a slot 23 in its overlying portion. The slot 23 receives a pin 24 which is carried by the dove-tailed guide 19, permitting the guide to move not only relatively to the plate 21 but also relatively to the central guide member of block.

The dove-tailed guide 19 has a recess or bore 25 for the reception of an expansion coil spring 26 which is interposed between the guide 19 and the wall of the plate 21. The spring 26 serves to retain the dove-tailed guide 19 in contact with one of the beveled edges of the central gauge block or member 7, holding its opposite beveled edge against the guide 18. The slots 10 in the central gauge block or member and its facing plate are wide enough to permit of a slight play of the gauge block or member to permit the spring 26 to hold one beveled edge of the gauge block in contact with the guide 18. The dove-tailed guide 19 additionally serves to retain the block or member in the position in which it is set when gauging either the car body or the truck bolster until the wing nut 16 is tightened.

The central gauge member or block 7 is provided with a plurality of projections 27, there being intervening openings or recesses 28, the projections 27 acting to cooperate with the central plate 29 of the truck bolster when gauging the truck bolster and its side bearings. In the gauge 1 for gauging the car body, the projections 27 and intervening recesses 28 are omitted, in which case the end edge 30 of the central gauge plate or block cooperates with the central plate 31 of the car body 32 when gauging the side bearings of the car body.

In gauging the side bearing clearance for freight cars, the gauge 1 is placed so that the extensions 5 are opposite the side bearings 6 of the car body, in fact, engaged therewith, then the central gauge plate or block 7 is adjusted so that its edge 30 may engage the central plate 31 of the car body. The gauge 2 is placed so that the plates 4 at the end of the gauge body 3 may engage with the side bearings 33 of the truck bolster 34 and the projections 27 engage with the central plate 29 of the truck bolster. The recesses or openings 28 serve for the reception of the projecting parts of the central plate 29.

After the car body and the truck bolster are so gauged, the two gauges 1 and 2 are placed opposite each other so that the extensions 5 of the gauge 1 and the plates 4 of the gauge 2 are directly opposed and engaged and if the projections 27 engage with the edge 30 of the gauge plate or block of gauge 1, it will be necessary to shim the central plate of the truck bolster to provide the proper side bearing clearance. On the other hand, if the projections 27 are too far away from the edge 30, it will be necessary to shim the side bearings of the truck bolster for the purpose of providing the proper clearance.

The invention having been set forth, what is claimed is:

1. A car body and truck bolster gauge consisting of a pair of elements of which one is provided with means for determining the relative planes of the central plate and side bearings of a car body and the other provided with means for determining the relative planes of the central plate and side bearings of a truck bolster, the two elements being engageable with each other after setting to determine the relative planes of the central plates of the body and bolster.

2. A car body and truck bolster gauge consisting of a pair of elements of which each comprises a gauge body provided with terminal and intermediate gauge members, the terminal members of the two being stationary and designed for contact with the side bearings of a car body and truck bolster, the intermediate members being adjustable for contact with the central plates of the body and bolster and the elements after setting being engageable with the stationary members of one in contact with the sationary members of the other to determine the spacing between the intermediate members.

3. The structure of claim 2 in which the intermediate members are provided with stationary and adjustable dove-tailed guides, and means for holding the intermediate members in different adjusted positions.

4. The structure of claim 2 in which the intermediate members are provided with fixed and yieldable dove-tailed guides, and means for holding said members in different adjusted positions, one of the intermediate members having projections and intervening recesses, the latter for clearance and the former for contact with the bearing face of the central plate of the truck bolster.

5. The structure of claim 2 in which the intermediate members are provided with fixed and yieldable dove-tailed guides, said yieldable guides being provided with guide plates secured to the gauge body and overhanging the guides, and expansion springs compressed between the guide plates and the guides.

6. A car body and truck bolster gauge comprising a pair of complemental elements of which one is provided with fixed members for contact with the side bearings of a car body and an adjustable member for contact with the central plate, and the other provided with fixed members for contact with the side bearings of a truck bolster and an adjustable member for contact with the central plate of the same, said elements after setting being engageable with the fixed members of one in contact with the fixed member of the other to determine the spacing of the adjustable members.

7. The structure of claim 6 in which the adjustable member of the truck bolster element is provided with projections and intervening recesses of which the latter constitute clearance spaces and the former contact means for the central plate.

In testimony whereof he affixes his signature.

WILLIAM ORAN TRIMBLE.